(12) United States Patent
Huguet

(10) Patent No.: US 7,144,020 B2
(45) Date of Patent: Dec. 5, 2006

(54) SERVICE CART WITH PROTECTIVE BUMPERS AND RECESSED DRAWER HANDLES

(75) Inventor: Marty Huguet, Greer, SC (US)

(73) Assignee: Professional Tool Products, LLC, Greenville, SC (US)

( * ) Notice: Subject to any disclaimer, the term of this patent is extended or adjusted under 35 U.S.C. 154(b) by 245 days.

(21) Appl. No.: 10/746,412

(22) Filed: Dec. 24, 2003

(65) Prior Publication Data

US 2005/0140106 A1    Jun. 30, 2005

(51) Int. Cl.
 *B62B 3/00* (2006.01)
(52) U.S. Cl. .................. 280/47.34; 280/79.11
(58) Field of Classification Search ..................... None
 See application file for complete search history.

(56) References Cited

U.S. PATENT DOCUMENTS

| | | | |
|---|---|---|---|
| 1,822,213 A * | 9/1931 | Hamilton ..................... 40/325 |
| 2,329,767 A | 9/1943 | Jakeway |
| 2,525,208 A | 10/1950 | Clink |
| 2,575,661 A | 11/1951 | Hickey |
| 2,697,244 A | 12/1954 | Lincke |
| 2,981,549 A | 4/1961 | Hotton |
| 3,997,218 A | 12/1976 | Wolf et al. |
| 4,066,155 A * | 1/1978 | Buchek .......................... 190/3 |
| 4,120,549 A | 10/1978 | Bureau |
| 4,318,575 A * | 3/1982 | Redlich .................... 312/249.9 |
| D283,263 S | 4/1986 | Richey |
| 4,586,762 A | 5/1986 | Kennedy et al. |
| 4,589,711 A * | 5/1986 | Plank ....................... 312/265.1 |
| 4,600,204 A * | 7/1986 | Badger ................. 280/33.992 |
| 4,621,849 A * | 11/1986 | Berfield ...................... 293/155 |
| 4,643,280 A * | 2/1987 | Hensley ........................ 190/11 |
| 4,880,248 A | 11/1989 | Elmer |
| 5,114,522 A * | 5/1992 | Takado et al. ............... 156/245 |
| 5,131,669 A * | 7/1992 | Kinnamon et al. ..... 280/33.992 |
| 5,221,132 A | 6/1993 | Combs et al. |
| D337,404 S | 7/1993 | Miles |
| 5,259,668 A * | 11/1993 | Teufel et al. .......... 312/249.11 |
| 5,290,058 A * | 3/1994 | Adams et al. .............. 280/651 |
| 5,351,792 A * | 10/1994 | Cohen ...................... 190/18 A |
| 5,489,106 A | 2/1996 | Engelking et al. |

(Continued)

*Primary Examiner*—Christopher P. Ellis
*Assistant Examiner*—Christopher Bottorff
(74) *Attorney, Agent, or Firm*—Alston & Bird LLP

(57) ABSTRACT

There is provided a transportable service cart with protective bumpers attached to the vertical corners of the service cart. The service cart of the present invention also comprises drawer handles that do not extend beyond a front surface of the drawers of the service cart or do not extend substantially beyond the front faces of the flanking protective bumpers. The service cart comprises features that prevent or minimize damage to the service cart, or to an object struck by the service cart, when the service cart engages another object. The protective bumpers attached to the outer side of each vertical corner of the service cart extend along at least a substantial portion of the height of the vertical corners to absorb a significant portion of an impact between the service cart and the other object. The drawer handles are attached to recessed surfaces in the front surfaces of the drawers and are advantageously bar type handles or extruded handles that comprise a gripping surface. A push handle may also be provided on the service cart and may comprise a protective overmold. Indicia indicating the manufacturer or retailer or other information may also be defined on various surfaces of the service cart, such as on the protective bumpers, the drawer handles, and/or the push handle.

21 Claims, 5 Drawing Sheets

U.S. PATENT DOCUMENTS

| | | |
|---|---|---|
| 5,588,659 A | 12/1996 | Boes et al. |
| 5,673,983 A | 10/1997 | Carlson et al. |
| 5,673,984 A * | 10/1997 | Insalaco et al. ............. 312/264 |
| 5,720,535 A | 2/1998 | Mehman |
| 5,913,582 A | 6/1999 | Coonan |
| 5,951,133 A * | 9/1999 | Dittberner et al. ....... 312/348.4 |
| D423,817 S | 5/2000 | Holcomb et al. |
| D423,818 S | 5/2000 | Holcomb et al. |
| D427,807 S | 7/2000 | Holcomb et al. |
| 6,264,219 B1 | 7/2001 | Smith |
| 6,484,472 B1 * | 11/2002 | Chi ......................... 52/718.02 |
| 6,578,938 B1 | 6/2003 | Norman et al. |
| 6,672,601 B1 * | 1/2004 | Hofheins et al. ........ 280/47.34 |
| 6,843,488 B1 * | 1/2005 | Tseng ...................... 280/47.35 |
| 2001/0030403 A1 * | 10/2001 | Johnson et al. |
| 2001/0035702 A1 | 11/2001 | Murphy et al. |
| 2003/0141687 A1 * | 7/2003 | Wixted et al. |
| 2003/0155729 A1 | 8/2003 | Chen |
| 2003/0164600 A1 * | 9/2003 | Dunn et al. |

* cited by examiner

SERVICE CART WITH PROTECTIVE BUMPERS AND RECESSED DRAWER HANDLES

BACKGROUND OF THE INVENTION

The present invention is related to transportable service carts, of the type commonly used for the convenient storage and transportation of items.

Service carts of the described type come in a variety of shapes and sizes that are typically tailored to a specific application or for use with particular items. They usually comprise a storage compartment and a plurality of wheels. The storage compartment may also comprise surfaces and/or shelves that provide a support surface for the stored items and may comprise drawers, cabinets, or other components that may completely enclose the stored items. The plurality of wheels is provided for convenient transport of the service cart.

One application for a service cart is in automotive repair facilities, wherein the service cart stores a technician's tools. The service cart may be transported to the approximate area that the technician is working, typically near a vehicle, to provide convenient access to the stored tools. Occasionally, a service cart will strike a vehicle while the vehicle is in the automotive repair facility, which is undesirable because such impacts between the service cart and vehicle may damage the exterior of the vehicle or the service cart and may damage the internal components of the vehicle or the stored items in the service cart. Repair facility equipment may also come into contact with the service cart on occasion. Such equipment may comprise shelving, vehicle lift systems, or other machinery that may also be damaged if impacted by a service cart.

The damage to the struck object or the service cart is typically caused by the extremities of the cart, such as the corners of the cart, protruding shelves, protruding handles, or the like. The extremities of the cart are most likely to come into contact with other objects, and the extremities often define relatively sharp features, such as a non-radiused corner or a corner with minimal curvature. Such sharp features concentrate the impact on the struck object during the impact, which increases the amount of damage to the object rather than dispersing the impact over a larger area and reducing the damage.

Therefore a need exists for a transportable service cart that reduces or prevents damage to struck objects and the service cart when the service cart impacts other objects. A further need exists for a transportable service cart that reduces the likelihood of impacts between a service cart and other objects.

BRIEF SUMMARY OF THE INVENTION

The invention addresses the above needs and achieves other advantages by providing a transportable service cart that comprises a generally box-like frame having four vertical corners that extend from a bottom portion of the service cart to a top portion to define a height of the service cart. A storage component is mounted within the frame. Alternatively, the service cart comprises a storage compartment without a frame, such that the storage compartment defines the vertical corners of the service cart. A plurality of wheels is joined to the bottom portion of the service cart so that the service cart is transportable. At least one protective bumper is attached to overlie an outer side of at least one vertical corner and extend along at least a substantial portion of the height of the service cart. Accordingly, when the service cart strikes another object, the protective bumpers are more likely to engage the other object such that the impact is dampened and dispersed to reduce or prevent damage to the struck object or service cart.

The protective bumpers of the present invention advantageously are a blow molded material, such as polyethylene, and may define indicia to identify the manufacturer or retailer of the service cart. Fasteners or adhesives may be used to attach the protective bumpers to the corners of the storage compartment. In addition, the service cart may also comprise a push handle on a side of the service cart, wherein the push handle may comprise an overmold that comprises a gripping surface and defines indicia.

An alternative service cart of the present invention, which may or may not comprise the protective bumpers on the vertical corners of the service cart, comprises slidably mounted drawers in the storage compartment. The drawers define at least one recess in a front surface of the drawer such that the recess defines a recessed surface. A drawer handle, such as a bar type handle or extruded handle, is attached to the recessed surface of the drawer. The drawer handle advantageously does not extend beyond or substantially beyond the front surface of the drawer. If the protective bumpers are provided, the drawer handle advantageously does not extend beyond or substantially beyond the front face of the flanking protective bumpers. The service cart also comprises a plurality of wheels joined to the bottom portion of the service cart so that the service cart is transportable. Accordingly, objects struck by the service cart of the present invention are less likely to impact the drawer handles of the service cart, which not only reduces the number of impacts between the service cart and other objects, but also prevents the concentration of the impact on the relatively small surface of the handle. Therefore, the service cart with the recessed drawer handles reduces or prevents damage to the other object and the service cart.

Service carts of further embodiments may define recesses defining generally hexagonal shapes or elliptical shapes into which the bar type drawer handle is attached. Alternatively, the extruded drawer handle may be attached to a recessed surface that substantially extends along the longitudinal length of the drawer so that the extruded handle substantially extends along the longitudinal length of the drawer. The drawer handles may also define indicia on a surface of the handles opposite the gripping surface of the respective handles.

Therefore, the present invention provides a service cart with protective bumpers and/or recessed drawer handles so that damage to a struck object or the service cart is reduced or prevented when the service cart impacts another object.

BRIEF DESCRIPTION OF THE SEVERAL VIEWS OF THE DRAWINGS

Figure 1:
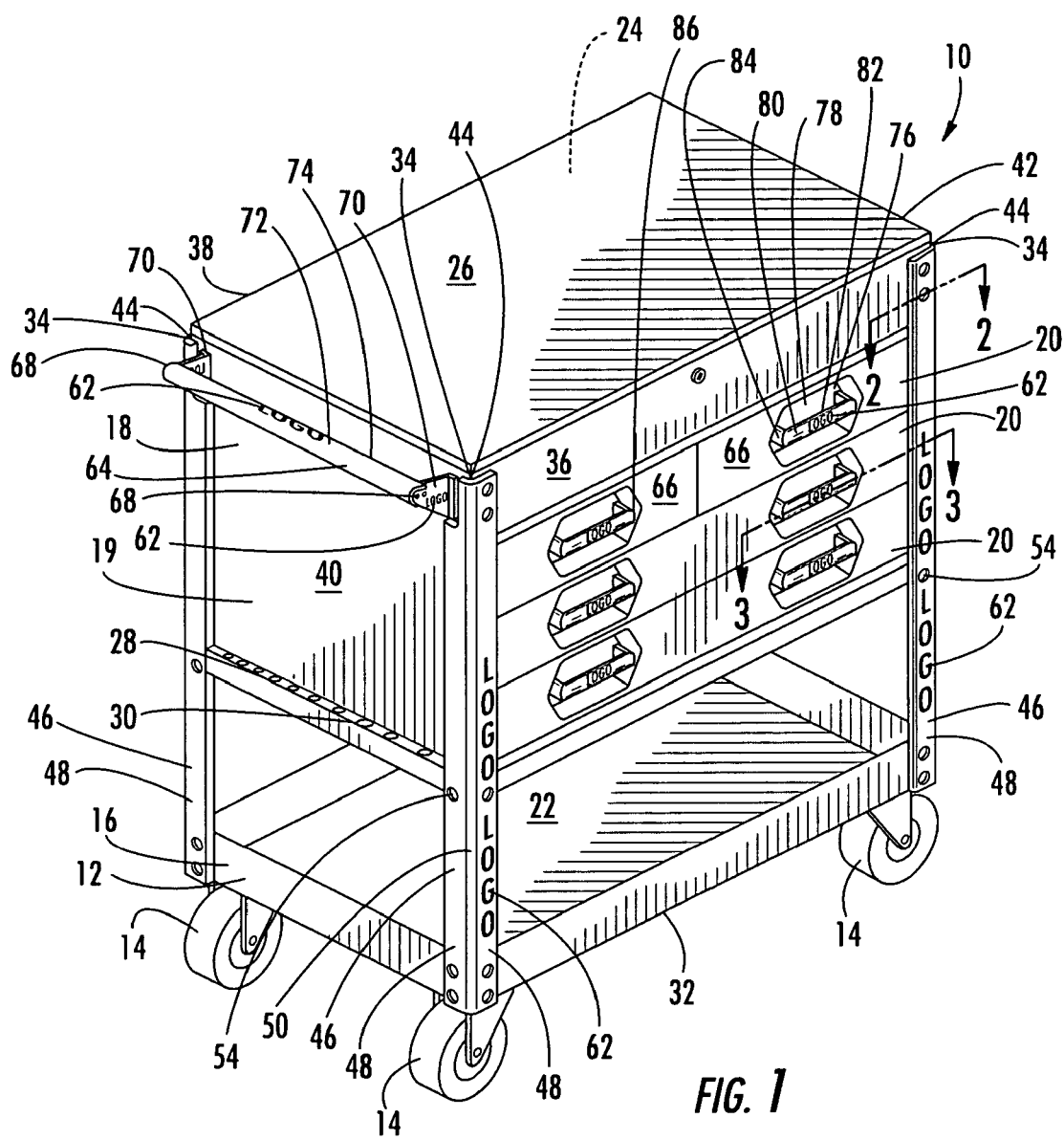
Figure 2:
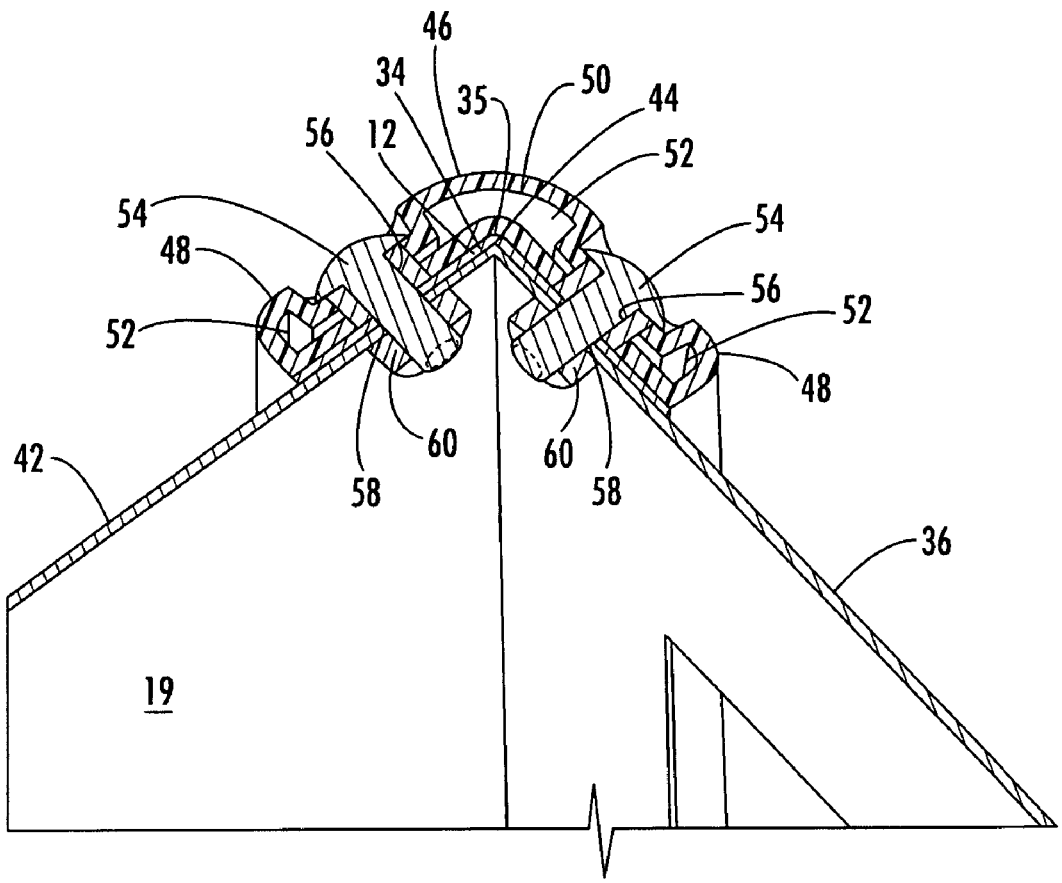
Figure 3:
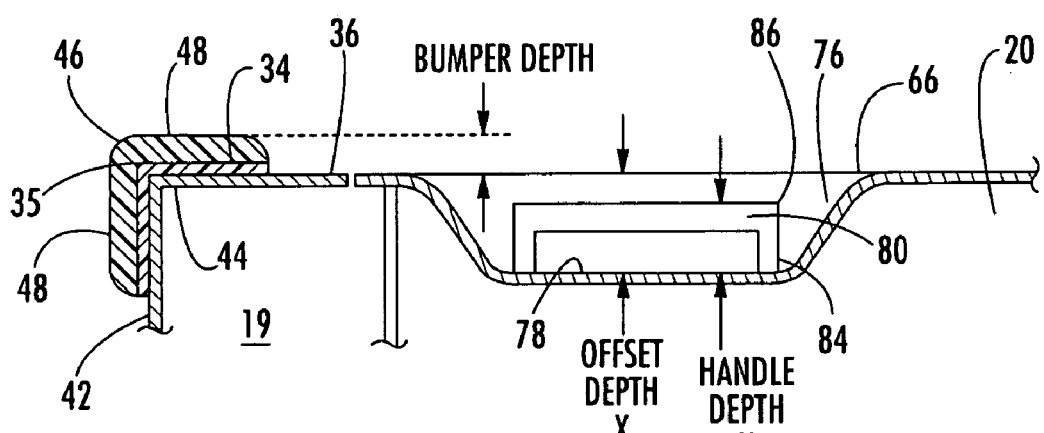
Figure 4:
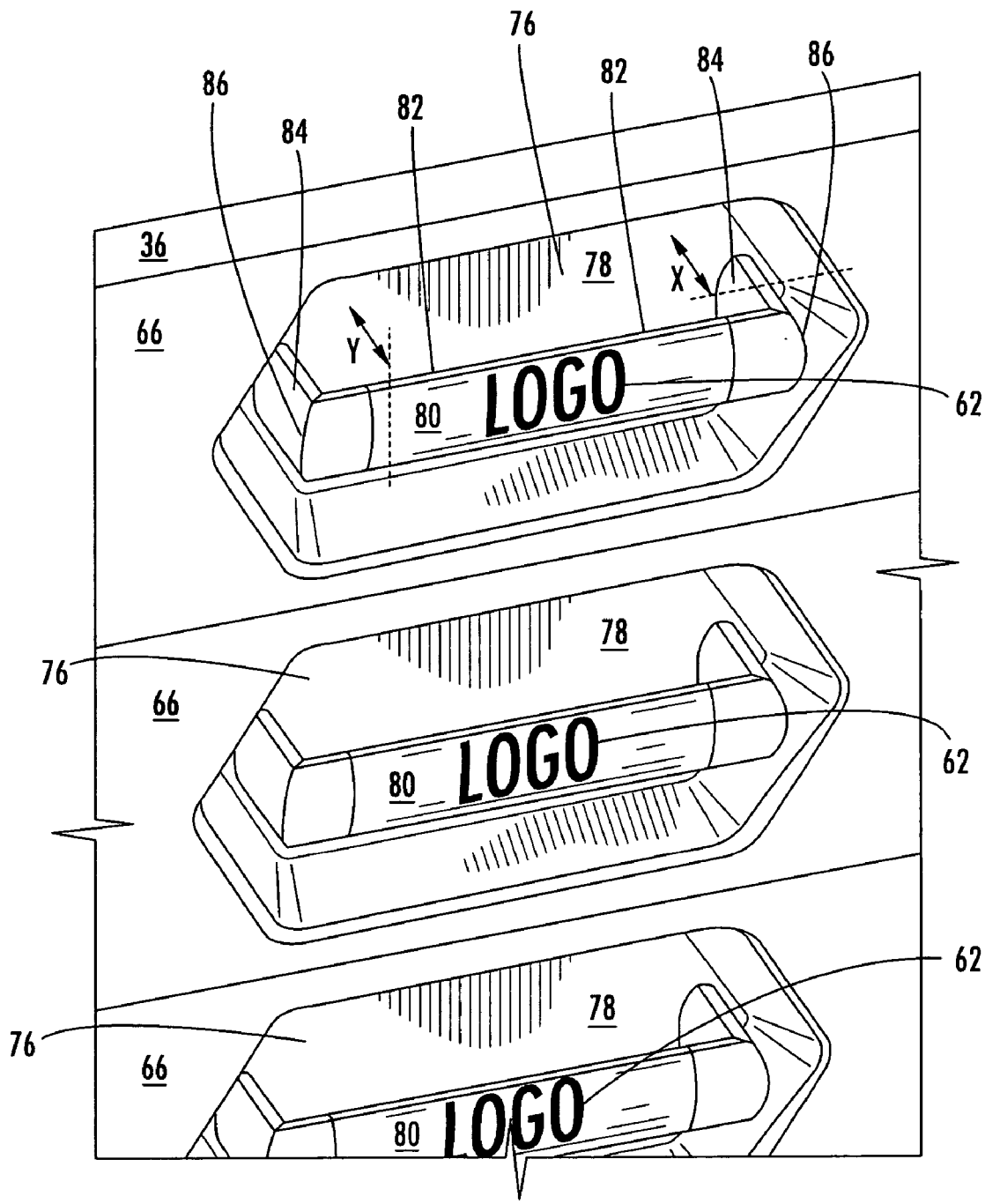
Figure 5:
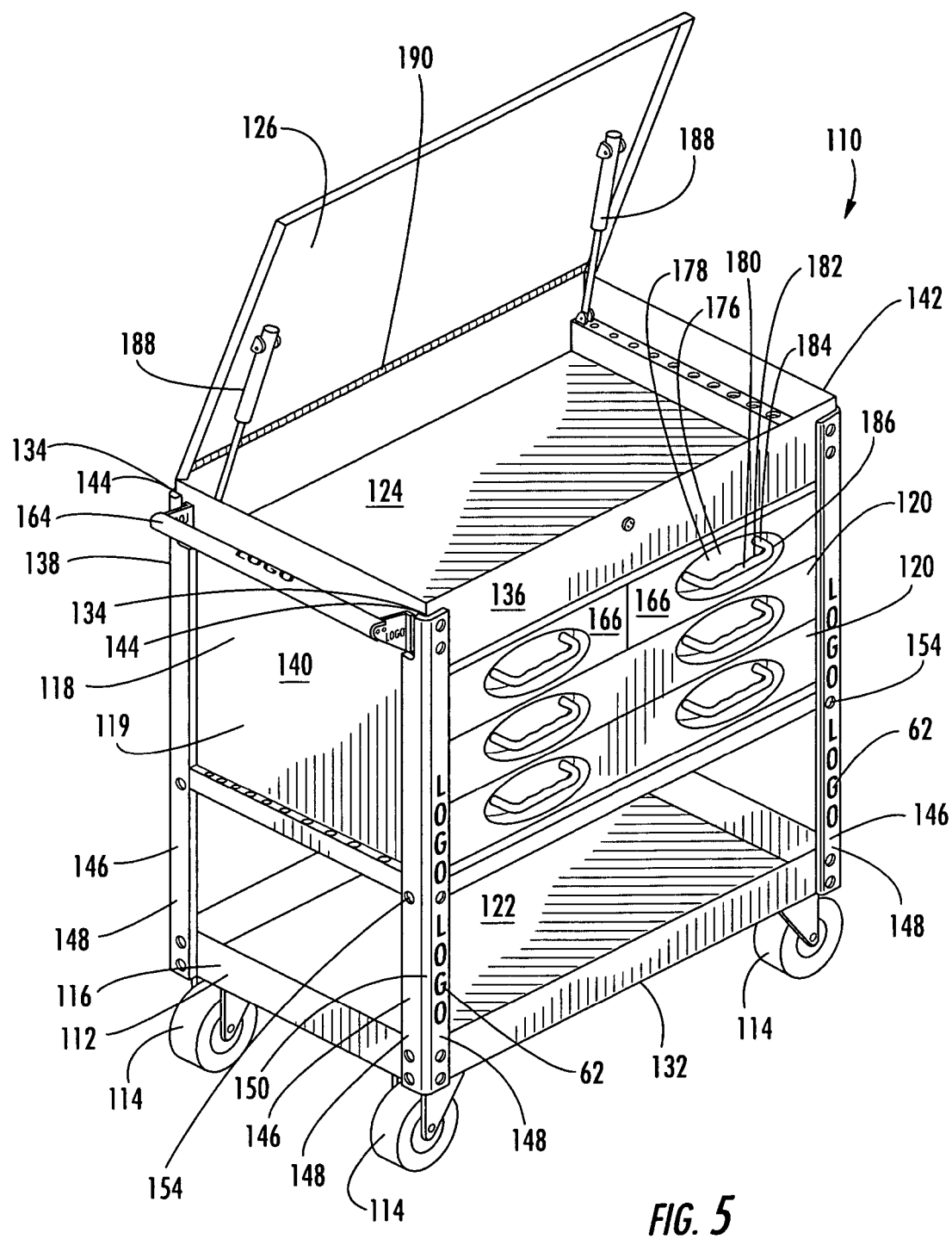
Figure 6:
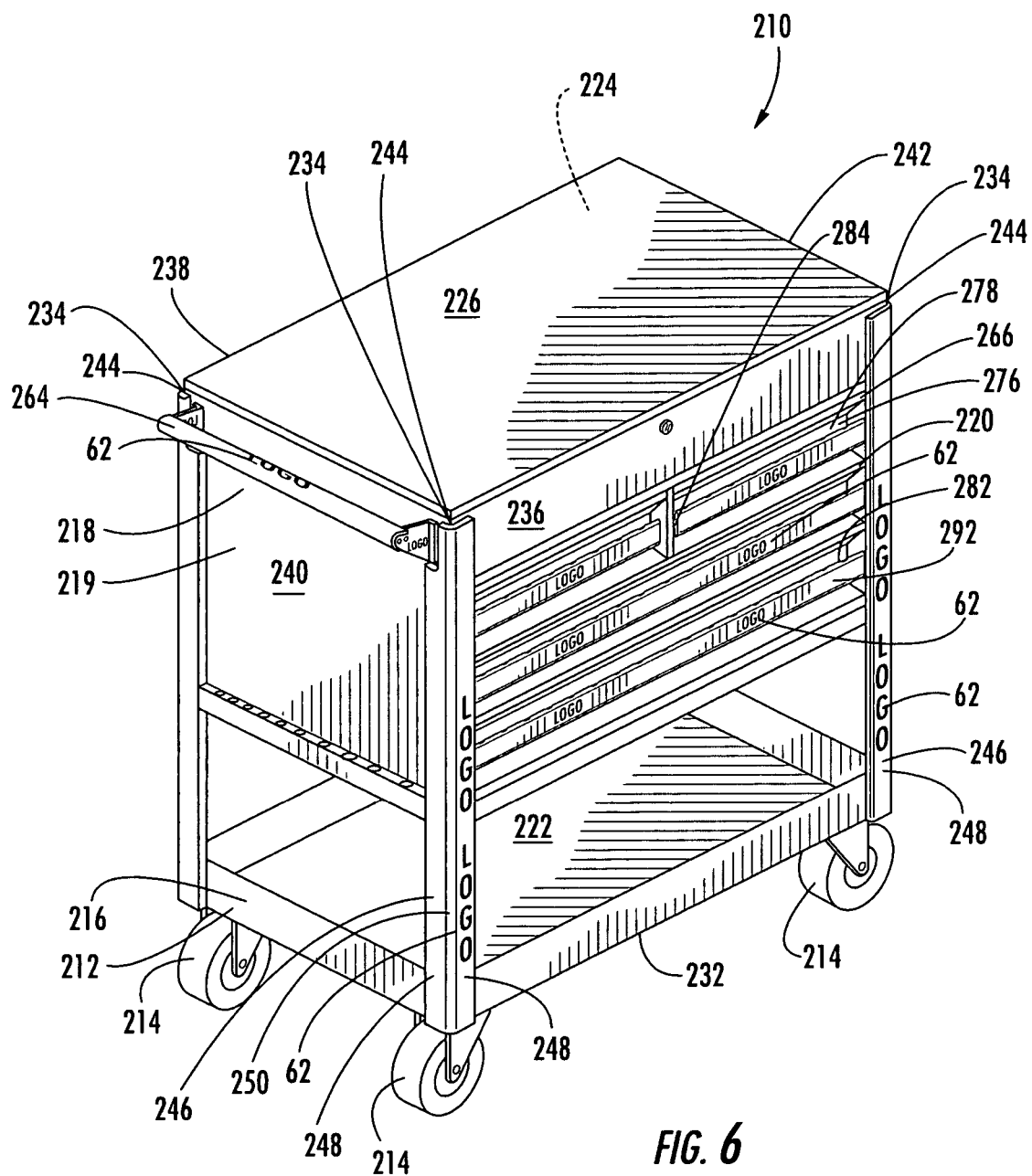

Having thus described the invention in general terms, reference will now be made to the accompanying drawings, which are not necessarily drawn to scale, and wherein:

FIG. 1 is a perspective view of a service cart in accordance with one embodiment of the present invention, illustrating the protective bumpers, the recessed bar type drawer handles, and the push handle;

FIG. 2 is detailed sectional perspective view of the protective bumper of the service cart of FIG. 1 taken along the line 2—2 of FIG. 1, illustrating the fasteners used to attach the protective bumper to the vertical corner of the service cart;

FIG. 3 is detailed sectional top view of the protective bumper and drawer of the service cart of FIG. 1 taken along the line 3—3 of FIG. 1, illustrating a drawer handle that does not extend substantially beyond the front face of the flanking protective bumper;

FIG. 4 is an enlarged perspective view of the recessed bar type drawer handles of the service cart of FIG. 1, illustrating the offset depth of the recess and the handle depth of the bar type handle;

FIG. 5 is a perspective view of a service cart in accordance with a second embodiment of the present invention, illustrating elliptical recesses for the recessed bar type drawer handles defining finger grooves on the gripping surfaces of the handles and illustrating the top lid in the open position; and FIG. 6 is a perspective view of a service cart in accordance with a third embodiment of the present invention, illustrating recessed extruded drawer handles attached to the front surfaces of the drawers.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1–4, a service cart 10 in accordance with one embodiment of the present invention is illustrated. The service carts of the illustrated embodiments are preferably tool carts for storing tools used for servicing automotive vehicles. The service cart advantageously comprises drawers and other features for storage of hand tools and automotive specialty tools, as well as other items commonly stored or supported by tool carts in repair facilities. Service carts of further embodiments of the present invention may comprise carts of any shape or any size specifically designed for use with alternative applications or for storage of different items.

The service cart 10 of FIG. 1 comprises a generally box-like frame 12 and a plurality of wheels 14. The frame 12 extends vertically from a bottom portion 16 of the service cart to a top portion 18 of the service cart to define a height of the generally box-like frame, which in the illustrated embodiment is the height of the service cart 10. The frame 12 of FIG. 1 advantageously defines a vertical height of 30 to 40 inches, though service carts of further embodiments of the present invention may define any vertical height. The frame 12 of the illustrated embodiment generally defines the outermost portions of the service cart 10, such as the vertical corners and horizontal corners, as described more fully below. The bottom portion 16 of the service cart 10 generally defines the lowermost portion of the service cart and comprises the bottom surface of the service cart. Likewise, the top portion 18 of the service cart 10 generally defines the uppermost portion of the service cart.

The service cart 10 of the illustrated embodiments comprises a storage compartment 19 that is mounted within the frame 12. The storage compartment 19 advantageously comprises at least one slidably mounted drawer 20. The drawers 20 are slidably mounted through an opening in a front panel of the storage compartment 19 in a conventional manner. The frame 12 of FIG. 1 comprises a tray 22 located in the bottom portion 16 of the frame, and the storage compartment 19 may comprise additional storage areas, such as a top shelf 24 enclosed by the side panels of the storage compartment and a top lid 26 pivotally connected to one of the panels. The top lid 26 of FIG. 1 defines the top surface of the service cart 10. The storage compartment 19 generally defines interior storage areas; however, the storage compartment may comprise generally exterior features such as a flange 28 that define at least one orifice 30 for the placement of items, such as prybars and screwdrivers, generally on the exterior of the storage compartment. The flange 28 of FIG. 1 extends outward from a side panel of the storage compartment 19 and defines a generally horizontal surface that extends from a front of the storage compartment to the back of the storage compartment. However, the flange 28 advantageously does not extend beyond the protective bumpers of the present invention. The storage compartment of further embodiments of the service cart may comprise additional storage areas or features.

The bottom portion 16 of the service cart 10 defines a bottom surface 32 of the service cart, which is generally opposite the top lid 26. The bottom portion 16 and the top portion 18 of the service cart 10 define the horizontal corners of the service cart 10 on the bottom and top, respectively, of the cart. The frame 12 also comprises four supports 34 that define the vertical corners 35 of the service cart and that extend from the bottom surface 32 of the service cart to the top lid 26 of the storage compartment 19 to define the height of the service cart. The vertical corner 35 of the service cart, which is located on the support 34, as illustrated in FIG. 2, defines a right angle and advantageously overlies the intersections of the panels of the storage compartment 19. The front panel 36 and the back panel 38 of the storage compartment 19 are preferably parallel to each other and orthogonal to the parallel left panel 40 and right panel 42 of the storage compartment, such that the storage compartment defines a generally box-like shape with right angles. The intersections of the front panel 36 and the left and right panels 40 and 42, as well as the intersections of the back panel 38 and the left and right panels, define the intersections 44, as shown in FIG. 2. The panels 36, 38, 40, and 42 define a rectangular enclosure of the storage compartment 19 which is mounted to the inside surfaces of the supports 34 of the illustrated embodiment during fabrication of the service cart 10.

The supports 34 of the frame 12 of FIGS. 1 and 2 extend vertically from the bottom surface 32 of the service cart to the top lid 26 of the storage compartment 19. The storage compartment 19 is suspended above the tray 22 to define an opening for storage of items. Further embodiments of the present invention may comprise storage compartments that vertically extend the entire height of the service cart such that the storage compartment defines the bottom and the top portions of the cart. Such further embodiments may not require the supports of the frame, such that the intersections of the panels of the storage compartment would define the vertical corners of the service cart. Accordingly, the storage compartment of the further embodiments is fabricated or assembled to comprise the supports, vertical corners, and top and bottom portions of the service cart. Still further embodiments of the present invention may include a frame and storage compartment of alternative shapes or sizes.

Referring again to the transportable service cart 10 of FIG. 1, the plurality of wheels 14 is joined to the bottom surface 32 of the service cart. Further embodiments of the service cart may comprise a plurality of wheels joined to any surface or panel of the bottom portion 16 of the storage compartment such that the service cart is transportable. The plurality of wheels 14, which in the illustrated embodiments of FIGS. 1, 5, and 6 comprises four wheels, enables the service cart 10 to be conveniently rolled around such that a technician using the items stored in the service cart may conveniently move the service cart to be proximate the area that the technician is working, such as near a vehicle in an automotive repair facility. The plurality of wheels 14 advantageously comprises wheels, rollers, casters, or the like that define a locking feature to keep the service cart 10 in a fixed location when the locking feature is actuated. The plurality of wheels of further embodiments of the invention may comprise any rolling device or other device that provides for convenient transport of the service cart.

Because the vertical corners 35 of the service cart 10 are the most likely portions of the service cart 10 to contact another object, the present invention provides protective bumpers 46 attached to at least one support 34 to reduce the impact between the service cart and the struck object (not shown). The protective bumpers 46 of FIGS. 1–6 overlie an outer side of each vertical corner 35 of the service cart 10. The outer side of each vertical corner 35 of the illustrated embodiment comprises the surfaces of the support adjacent the vertical corner and the surface defining the vertical corner. The outer side of the vertical corner 35 of FIG. 2 defines a curved corner surface and two linear surfaces that are tangential to the vertical corner 35. Further embodiments of the service cart may define an outer side of the vertical corner with alternative surfaces that define any relative orientations and distances. Moreover, the outer side of the vertical corner of alternative embodiments of the present invention may define only the curved corner surface or one or more linear surfaces so long as the vertical corner is protected by the overlying protective bumper from impacts from multiple directions.

As shown in FIGS. 2 and 3, the protective bumper 46 of the present invention preferably comprises two front faces 48 and a rounded face 50. The front faces 48 each overlie the linear surfaces tangential to the vertical corner 35, while the rounded face 50 overlies the curved corner surface of the vertical corner. As shown in FIG. 1, the forward facing front faces 48 of the two protective bumpers 46 attach to the front vertical corners 35 of the service cart 10, such that the two protective bumpers flank the drawers 20. The two forward facing front faces 48 of the flanking protective bumpers 46 flank the drawers 20 such that the front faces are located on either side of the drawers 20. The protective bumpers 46 define a bumper depth, as illustrated in FIG. 3, from the respective panel of the storage compartment 19, such as the front panel 36, to the front face of the protective bumper, such as the forward facing front face 48 of the flanking protective bumper. In the illustrated embodiments of the present invention, the front panel 36 of the storage compartment 19 is in substantially the same plane as the front surfaces of the drawers 20 in a slidably closed position. Accordingly, the bumper depth also defines the perpendicular distance from the front surface of the drawer 20 in a slidably closed position to the forward facing front faces 48 of the flanking protective bumpers 46. The bumper depth in embodiments of the service cart 10 with vertical supports 34 may include the thickness of the vertical support in the bumper depth, as shown in FIG. 3. Advantageously, the bumper depths of the two front faces 48 of the flanking protective bumpers 46 are equivalent. However, the front faces of further embodiments of the protective bumpers may define any relative bumper depths. The rounded face 50 advantageously defines a radius that is preferably greater than or equal to the radius of the vertical corner 35 of the service cart 10 which the protective bumper 46 overlies, as shown in FIG. 2. In addition, the rounded face 50 advantageously defines a thickness that is equal to or greater than the bumper depth of the front faces 48. Further embodiments of the present invention may comprise a rounded face having any relative radius, or no radius at all, and having any relative thickness. In addition, protective bumpers of still further embodiments may each comprise only two front faces attached proximate to the vertical corner of the service cart, wherein the front faces define bumper depths sufficient to protect the vertical corner.

The protective bumper 46 advantageously defines a hollow portion 52 between an outside surface of the protective bumper and the vertical corner 35 of the service cart 10, such that the hollow portion is between two layers of the protective bumper 46, as shown in FIG. 2, or the hollow portion is between a single layer of the protective bumper, which is the outside surface of the protective bumper, and the vertical corner of the service cart. The hollow portion 52 reduces the amount of material required to manufacture the protective bumpers 46, thus reducing the cost of the protective bumpers, and provides more flexibility to the protective bumper, which improves the deflection and absorption of an impact between the service cart 10 and a struck object. The hollow portion 52 advantageously extends within the front faces 48 and the rounded face 50 to define one hollow portion along a cross section of the protective bumper 46, as shown in FIG. 2. Further embodiments of the service cart may comprise protective bumpers with hollow portions of different shapes or with no hollow portion, such as the protective bumper shown in FIG. 3.

The protective bumper 46 of the illustrated embodiment is attached to the service cart 10 with fasteners 54. As shown in FIG. 2, the protective bumper 46 comprises orifices 56 that can be aligned with through holes 58 in the support 34 and storage compartment 19 such that the fastener 54 can pass through the orifice and through holes to be threaded into a nut 60 on the inside of the storage compartment. The protective bumper 46 of FIG. 2 is fastened through each front face 48 at equivalent vertical heights; however, further embodiments of the protective bumper may comprise any number or arrangement of fasteners to attach the protective bumpers. Furthermore, the protective bumpers 46 may be attached with alternative fasteners, such as screws or bolts threaded into threaded holes of the support and/or storage compartment, as well as rivets or snap buttons, to list a few non-limiting examples. Alternative protective bumpers 246, such as the bumpers of FIG. 6, may be adhered to the support 234 with an adhesive applied between a surface opposite the front face 248 and/or the rounded face 250 and the vertical corner of the service cart 210. Further embodiments of the present invention may attach the protective bumpers in alternative ways; non-limiting examples include joining the bumper material directly onto the storage compartment during the manufacture of the protective bumper or fabricating the storage compartment to retain the protective bumpers.

The protective bumpers 46 of FIGS. 1 and 2 are preferably manufactured from a high density polyethylene (HDPE), or similar flexible material, for improved impact absorption. HDPE is a relatively hard material compared to an elastomer or other soft material, it may be blow molded to form bumpers with various indicia, and it would be more durable and provide a more attractive appearance than some elastomers or other soft materials. The blow molded bumpers could also provide a double wall construction for the hollow portion 52, which provides flexibility and absorbs impact energy to avoid or minimize damage to other surfaces. Alternative embodiments may be manufactured from an elastomer material because of its resilience and durability or from other polymer materials or soft metals, such as aluminum, that define a minimum thickness to flex and thereby absorb the energy of an impact with minimal aesthetic damage to the protective bumper. Further embodiments of the service cart 10 may comprise protective bumpers of alternative material. The protective bumpers 46 advantageously are capable of flexing and absorbing impacts to reduce damage to the service cart 10 and struck objects such that the protective bumpers are not plastically deformed. The protective bumpers 46 are also advantageously manufactured from a material that will not deteriorate with time or exposure to sunlight, certain chemicals, or other environmental conditions.

The protective bumpers 46 of the service cart 10 of the present invention are advantageously manufactured by blow molding or thermoforming, which are well known in the art. The protective bumpers 46 of the illustrated embodiments are advantageously blow molded HDPE, which are blow molded prior to being attached to the service cart 12. The protective bumpers 46 of the illustrated embodiment define indicia 62 on the front face 48, which may be used to indicate the manufacturer or retailer of the service cart 10 or provide alternative information. The indicia 62 may protrude outward beyond the front face 48 or may be recessed in the front face. Advantageously, the molds used to manufacture the protective bumpers 46 may comprise interchangeable portions so that the indicia 62 can be edited, replaced, or removed as desired by the manufacturer. The illustrated embodiments define indicia 62 on the forward facing front faces 48 on the front panel 36 of the storage compartment 19 only; however, further embodiments of the present invention may define indicia on the front faces on the front, left, right, and/or back panels of the storage compartment and/or on the rounded faces of the protective bumpers. In addition, indicia may be defined on the rounded face 50 of the protective bumper 46.

Advantageously, the attached protective bumpers 46 extend along at least a substantial portion of the height of the service cart 10, as show in FIGS. 1, 5, and 6 to provide protection for the service cart and objects that may be struck by the service cart. The protective bumpers 46 are not required to extend the entire height from the bottom surface 32 to the top lid 26, but only along a substantial portion of the height. For example, the protective bumpers 46 extend at least 25% of the height of the service cart 10, and more preferably extend at least 50% of the height of the service cart, and even more preferably extend at least 75% of the height of the service cart, thereby extending at least a substantial portion of the height thereof. In further embodiments of the service cart 10, the protective bumpers 46 extend at least along the top portion 18 of the service cart. The protective bumpers 46 of the illustrated embodiments overlie a substantial portion of the vertical corners 35 of the service cart 10 such that the corners are protected from other objects. The protective bumpers 46 comprise one protective bumper attached to each vertical corner 35, wherein the individual protective bumpers define a generally consistent cross-sectional area, as shown in FIG. 2, without interruptions, other than to provide clearance for the push handle of the service cart, as shown in FIG. 1. Protective bumpers of further embodiments of the present invention may comprise two or more individual protective bumpers on a single vertical corner of the service cart. Still further embodiments of the present invention may provide protective bumpers of alternative shapes and arrangements to significantly protect the service cart.

To facilitate the transport of the service cart 10, the service cart advantageously comprises a push handle 64, as illustrated in FIG. 1. The push handle 64 of the illustrated embodiments is joined to the supports 34 of the frame 12 on sides of the supports that are generally perpendicular to the front panel 36 of the storage compartment 19. The push handle 64 may alternatively be joined to the left panel 40 of the storage compartment 19, which is also generally perpendicular to the front panel 36 of the storage compartment. If the service cart 10 comprises drawers 20 that define a generally planar front surface 66 that is generally parallel to the front panel 36 of the storage compartment, the push handle 64 extends along a direction that is generally perpendicular to the front surface of the drawers. The push handle 64 of FIG. 1 is an extruded handle that defines two ends 68 and comprises a bracket 70 extending from each end of the push handle. The bracket 70 provides a space between the push handle 64 and the surface of the service cart 10, such as the supports 34 of the frame 12, to which the bracket is joined. The bracket 70 is advantageously joined to the support 34 with fasteners, similar to fasteners described for the protective bumper 46, or the bracket may be joined by alternative devices. The bracket 70 may also define indicia 62, as is shown in FIG. 1. Further embodiments of the bracket 70 may comprise a polymer material joined, either permanently or removably, to the bracket to absorb impacts between the bracket and other objects. Such a bracket 70 may include an opening such that the indicia 62 on the bracket are visible.

The push handle of the illustrated embodiment comprises an overmold 72 that is axially inserted over the push handle 64 before the brackets 70 are joined to the push handle. An alternative overmold 72 may be wrapped about the push handle 64 if the push handle is rigidly joined to the brackets 70, which would prevent the axial insertion of an overmold onto the handle. Further embodiments of the push handle may comprise alternative overmolds. The overmold 72 of FIG. 1 provides a cushioned gripping surface 74 for the person pushing the service cart 10 to grip and may comprise finger grooves on the gripping surface to provide an improved grip on the push handle 64. The overmold 72 is advantageously a polymer material, such as HDPE or an elastomer to list two non-limiting examples, and may define indicia 62 on the overmold to identify the manufacturer or retailer, or to provide information to the user of the service cart 10. Overmolds of further embodiments of the present invention many be manufactured from any material and may define alternative indicia or no indicia.

Because the push handle 64 defines a surface that projects beyond the protective bumpers 46 in the illustrated embodiments, the overmold 72 provides an impact absorbing surface to reduce damage to the service cart 10 or other object if the push handle strikes another object. The overmold 72 advantageously extends over the bracket 70 to cover the outermost surfaces of the bracket, as shown in FIG. 1. Further embodiments of the present invention may comprise alternative push handles, recessed push handles that do not extend beyond the protective bumpers, or no push handles.

The service cart 10 of the present invention also provides recessed drawer handles to reduce or prevent damage caused when the handles of a service cart strike an object. The drawers 20 of the service cart 10 of FIGS. 1 and 4 comprise recesses 76 that define a generally hexagonal shape. The recess comprises six sides that may be angled or generally perpendicular to the front surface 66 of the drawers 20 and that advantageously comprise radiused intersections of the six sides. Further embodiments of the recesses may include alternative hexagonal shapes or may define non-hexagonal shapes. The recess 76 further comprises a recessed surface 78. The sides of the recess 76 advantageously join the recessed surface 78 to the front surface 66 of the drawer 20, wherein the sides may be oriented at any angle relative to the recessed surface and/or front surface of the drawer. The recessed surface 78 is inwardly offset in a perpendicular direction from the front surface 66 of the drawers 20 such that the recess 76 defines an offset depth "X" in a perpendicular direction from the recessed surface to the front surface of the drawer, as shown in FIGS. 3 and 4. Advantageously, the recessed surface 78 of the illustrated embodiment is generally parallel to the front surface 66 of the drawers 20.

A bar type drawer handle 80 is attached to the recessed surface 78 to define a recessed drawer handle for the service cart 10. The bar type handle 80 defines a gripping surface 82 spaced from the recessed surface 78. The bar type handle 80 of FIGS. 1–4 defines a handle depth "Y" from the surface of the handle opposite the gripping surface to the recess surface, which is no greater than the offset depth "X" of the recess 76 such that the bar type handle extends no further than the front surface of the drawer. Further embodiments of the recess 76 define an offset depth "X", or a handle depth "Y" of the bar type handle 80, such that the bar type handle does not extend beyond or substantially beyond the front faces 48 of the flanking protective bumpers 46. In such embodiments, the handle depth of the bar type handle 80 is not greater or substantially greater than the combined distances of the offset depth and the bumper depth, preferably not greater than one inch, and more preferably not greater than one-half inch than the combined distances of the offset depth and the bumper depth. If the service cart comprises a storage cart mounted within a frame, then the bumper depth includes the thickness of the supports 34 of the frame 12 and the bumper 46 as shown in FIG. 3. Alternatively, if the service cart is fabricated to define the frame, such that the vertical corners of the storage compartment define the vertical corners of the service cart, then the bumper depth would not include the thickness of supports 34. A recessed drawer handle 80 that extends no further than the front surface 66 of the drawers 20 or does not extend substantially beyond the front faces 48 of the flanking protective bumpers 46 is particularly advantageous when the service cart 10 is being pushed through a narrow passage where an otherwise protruding drawer handle would strike an object but the recessed drawer handle would not strike the object or would be less likely to strike the object.

The recessed surface 78 of the recess 76 is advantageously the innermost surface of the recess, such as the recessed surface of FIG. 3. However, the recess of further embodiments of the present invention may comprise multiple surfaces of varying perpendicular distances. Non-limiting examples of alternative recessed surfaces include curved surfaces or multifaceted surfaces. In such embodiments, the recessed surface comprises the surface to which the bar type handle is attached such that the offset depth is measured from the front surface of the drawer to the recessed surface, independent of the additional surfaces of the recess.

Bar type handle 80 of FIGS. 1 and 4 comprises a gripping surface 82 that is spaced from the recessed surface 78 by two standoffs 84. The gripping surface 82 is generally perpendicular to the parallel standoffs 84 and intersects the standoffs at right angles to define the handle corners 86. The standoffs 84 are attached to the recessed surface 78 with fasteners (not shown); however, further embodiments of the bar type handles may be attached in alternative ways. The handle depth of the bar type handle 80 of FIGS. 3 and 4 is illustrated as "Y" and is the perpendicular distance from the recessed surface 78 to the surface of the bar type handle opposite the gripping surface 82. The surface opposite the gripping surface 82 is preferably the outermost portion of the handle. The surface opposite the gripping surface 82 may define indicia 62, as illustrated in FIGS. 1 and 2 that may be defined in the bar type handle 80 when the handle is manufactured. Various manufacturing methods may be used to define the indicia and include non-limiting examples such as molding and machining.

FIG. 5 illustrates alternative bar type handles 180 for the service cart 110, as well as an alternative shape for the recess 176. The bar type handles 180 of FIG. 4 define a generally circular cross section and define rounded corners 186, as opposed to the non-circular cross section and sharp corners 86 of the bar type handles 80 of FIGS. 1 and 4. The gripping surface 182 of the bar type handles 180 of FIG. 4 defines finger grooves to facilitate contact between a user's hand and the gripping surface. Indicia may also be defined on the bar type handle 180 opposite the gripping surface 182. The bar type handles 180 preferably do not extend beyond or substantially beyond the front faces 148 of the flanking protective bumpers 146 and more preferably do not extend beyond or substantially beyond the front surface 166 of the drawers 120.

The recess 176 of FIG. 5 defines a generally elliptical shape, as opposed to the generally hexagonal shape of the recess 76 of FIGS. 1 and 4. Still further embodiments of the present invention may comprise recesses that define alternative shapes. The service cart 110 of FIG. 5 also illustrates the top lid 126 in an open position to provide access to the top shelf 124. The top lid 126 is pivotally mounted to the back panel 138 with a hinge 190 for movement of the top lid between open and closed positions. The top lid 126 comprises at least one lift assist 188 defined in the storage compartment 119, wherein the top lid in an open position is supported by the lift assist. The lift assists 188 of FIG. 5 are connected between the storage compartment 119 and the top lid 126. The lift assists of FIG. 5 connect to a pry bar or screwdriver holder on the top tray 124 of the storage compartment 119; however, lift assists of further embodiments of the present invention may be attached to any surface of the storage compartment. The lift assists 188, along with the hinge 190 about which the top lid rotates, support the top lid 126 when the lid is inclined in the open position. The lift assist 188 of FIG. 5 comprises a gas cylinder; however, further lift assists of the present invention include, but are not limited to pneumatic devices, spring lifts, ratcheted members, jack-like devices, or other lift assists known in the art.

Referring to FIG. 6, a third illustrated embodiment of the service cart 210 comprises recessed extruded drawer handles 292 that preferably do not extend beyond or substantially beyond a front surface 266 of the drawers 220, and more preferably do not extend beyond or substantially beyond the front faces 248 of the flanking protective bumpers 246. The drawers 220 each define a longitudinal length of the drawer, and the recess 276 substantially extends along the length of a drawer. The extruded handles 292 of the illustrated embodiment also substantially extend along the longitudinal length of the drawers 220. The recess 276 defines a recessed surface 278 to which the extruded handle 292 is attached, preferably with fasteners as described above. Alternatively, the extruded handle may be slidably inserted in a longitudinal direction into a portion of the recess structured and arranged to receive and retain the extruded handle. Further embodiments of the present invention may comprise alternative ways of attaching the extruded handle.

The recessed surface 278 is inwardly offset from the front surface 266 of the drawer 220 to define an offset depth in a perpendicular direction from the recessed surface to the front surface of the drawer. The extruded handle 292 of the illustrated embodiment defines a handle depth that is no greater than the offset depth of the recessed surface 278 such that the extruded handle does not extend beyond or substantially beyond the front surface 266 of the drawer 220. An alternative embodiment of the extruded handle 292 defines a handle depth that is not greater or substantially greater than a combined distance of the offset depth of the recess 276 and the bumper depth of the flanking protective bumpers 246 such that the extruded handle of the slidably closed drawer 220 does not extend beyond or substantially beyond the front faces of the flanking protective bumpers. Preferably the extruded handle does not extend more than one inch beyond the front faces of the flanking protective bumpers 246, and more preferably not greater than one-half inch beyond the front faces of the flanking bumpers 246. If the service cart comprises a storage cart mounted within a frame, then the bumper depth includes the thickness of the supports 34 of the frame 12 and the bumper 46 as shown in FIG. 3. Alternatively, if the service cart is fabricated to define the frame, such that the vertical corners of the storage compartment define the vertical corners of the service cart, then the bumper depth may not include the thickness of supports.

The extruded handle 292 of FIG. 6 comprises a gripping surface 282 that is generally bisected in a vertical direction by the standoff 284 of the extruded handle. The standoff 284 of the extruded handle 292 of FIG. 6 substantially extends along the entire longitudinal length of the extruded handle and is generally perpendicular to the gripping surface 282 and a surface opposite the gripping surface. Finger grooves are advantageously defined on the gripping surface 282. In addition, indicia 262 are defined opposite the gripping surface in the illustrated embodiment. Further embodiments of the present invention may include extruded handles of alternative shape and longitudinal length.

Still further embodiments of the present invention may comprise bar type drawer handles attached to the recess, such as the recess 76 of FIG. 1 or recess 176 of FIG. 2, wherein the handles are attached to the sides of the recess. The drawer handles are advantageously attached to the sides of the recess with fasteners or the like or may be fabricated with the drawer, such that the drawer handles are securely attached to the drawer. The drawer handles joined to the sides of the recess define a handle depth from the surface of the handle opposite the gripping surface to the recessed surface, wherein the handle depth is not greater or substantially greater than the offset depth of the recessed surface, such that the bar type handles preferably do not extend further than the front surface of the drawers, and more preferably do not extend substantially beyond the front faces of the flanking protective bumpers, if provided. Further embodiments of the drawer handles may include overmolds, similar to the overmold 72 of the push handle 64 described above, that are placed on the drawer handles to provide a protective overmold to absorb impacts if the drawer handle strikes another object. The overmold may be axially inserted on the drawer handle, either the bar type or extruded handles, or may be wrapped about the drawer handle. The recessed drawer handles comprising an overmold preferably do not extend beyond or substantially beyond the front surface of the drawers, and more preferably do not extend beyond or substantially the front face of the protective bumpers, if provided. The overmold of drawer handles that do extend beyond or substantially beyond the front surface of the drawers or front faces of the protective bumpers advantageously provides an impact absorbing surface to reduce damage to the service cart or other object if the drawer handle strikes another object. Additional embodiments of the drawer handles may define alternative structures or features.

To manufacture the service cart of the illustrated embodiment, the storage compartment is fabricated and mounted to the generally box-like frame. Alternatively, the storage compartment may be fabricated to define the frame, such that the vertical corners of the storage compartment define the vertical corners of the service cart. The storage compartment advantageously is fabricated to include shelves, drawers, lids, and/or the like as required. A plurality of wheels is joined to the bottom portion of the frame or storage compartment so that the service cart is transportable. The protective bumpers are attached to the vertical corners of the service cart, advantageously by fasteners, adhesives, or the like as described above. The protective bumpers extend vertically along at least a substantial portion of the height of the service cart and may define indicia.

For the embodiments of the service cart that comprise drawers with recessed handles, the drawers comprising the recesses are slidably mounted within the storage compartment before or after the handles have been attached to the recessed surfaces of the drawers. Either bar type handles or extruded handles may be attached to the drawers, and are preferably fastened to the drawers. The handles preferably define a handle depth that is not substantially greater than the combined distance of the offset depth from the recessed surface to the front surface of the drawer and the bumper depth from the front surface of the drawer to the front faces of the flanking protective bumpers, such that the handles do not extend beyond or substantially beyond the front faces of the flanking protective bumpers. More preferably, the handles define a handle depth that is not greater than or substantially greater than the offset depth such that the handles extend no further than the front surfaces of the drawers.

The service cart of the present invention eliminates protruding handles while providing a bar type handle or extruded handle to open the drawers of the service cart. Such recessed bar type or extruded handles are preferred to alternative drawer handles that are less convenient to grip or to apply a pulling force to open the drawer. The lack of protruding drawer handles reduces the likelihood of the handles contacting other objects during transportation of the service cart and the amount of damage to the handles or other objects if contact does occur. The push handle advantageously comprises a protective overmold to minimize the impact between the push handle and other objects that may contact the push handle. Likewise, the protective bumpers at the corners of the storage compartment minimize the impact between the service cart and other objects that may contact the service cart, thus reducing the amount of damage to each.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A transportable service cart for storing tools used for servicing automotive vehicles, the transportable service cart comprising:
   a generally box-like frame defining a top portion and a bottom portion of the service cart and comprising four vertical corners of the service cart that extend from the bottom portion to the top portion to define a height of the service cart;
   a storage compartment mounted within the frame, wherein the storage compartment comprises at least one slidably mounted drawer such that the at least one slidably mounted drawer may be selectively opened and closed;
   a plurality of wheels joined to the bottom portion of the service cart such that the service cart is transportable; and
   at least one protective bumper attached to overlie an outer side of each vertical corner so as to extend along at least a substantial portion of the height thereof.

2. A transportable service cart according to claim 1 wherein the at least one protective bumper is attached to the vertical corners of the service cart with at least one fastener.

3. A transportable service cart according to claim 1 wherein the at least one protective bumper defines a hollow portion between an outside surface of the at least one protective bumper and the vertical corner of the service cart.

4. A transportable service cart according to claim 3 wherein the at least one protective bumper comprises a blow molded material.

5. A transportable service cart according to claim 4 wherein the blow molded material comprises polyethylene.

6. A transportable service cart for storing tools used for servicing automotive vehicles, the transportable service cart comprising:
   a generally box-like storage compartment comprising four vertical corners of the service cart that extend from a bottom portion of the storage compartment to a top portion thereof to define a height of the storage compartment, wherein the storage compartment comprises at least one slidably mounted drawer such that the at least one slidably mounted drawer may be selectively opened and closed;
   a plurality of wheels joined to the bottom portion of the storage compartment such that the service cart is transportable; and
   at least one protective bumper attached to overlie an outer side of at least one vertical corner of the storage compartment so as to extend along at least a substantial portion of the height thereof.

7. A transportable service cart according to claim 6 wherein the at least one protective bumper is attached to the vertical corners of the storage compartment with at least one fastener.

8. A transportable service cart according to claim 6 wherein the at least one protective bumper defines a hollow portion between an outside surface of the protective bumper and the vertical corner of the service cart.

9. A transportable service cart according to claim 8 wherein the at least one protective bumper comprises a blow molded material.

10. A transportable service cart according to claim 9 wherein the blow molded material comprises polyethylene.

11. A transportable service cart according to claim 6 wherein the at least one protective bumper comprises an elastomer material.

12. A transportable service cart according to claim 6 wherein the at least one protective bumper comprises polyethylene.

13. A transportable service cart for storing tools used for servicing automotive vehicles, the transportable service cart comprising:
   a generally box-like storage compartment comprising four vertical corners of the service cart that extend from a bottom portion of the storage compartment to a top portion thereof to define a height of the storage compartment;
   a plurality of wheels joined to the bottom portion of the storage compartment such that the service cart is transportable; and
   at least one protective bumper attached to overlie an outer side of at least one vertical corner of the storage compartment so as to extend along at least a substantial portion of the height thereof;
   wherein the storage compartment defines a substantially planar front panel and at least one side panel generally perpendicular thereto, and wherein the service cart comprises a push handle joined to a side panel of the storage compartment so as to extend along a direction that is generally perpendicular to the front panel of the storage compartment.

14. A transportable service cart according to claim 13 wherein the push handle comprises an overmold comprising a cushioned gripping surface, and wherein indicia are defined on the overmold.

15. A transportable service cart for storing tools used for servicing automotive vehicles, the transportable service cart comprising:
   a generally box-like storage compartment comprising four vertical corners of the service cart that extend from a bottom portion of the storage compartment to a top portion thereof to define a height of the storage compartment;
   a plurality of wheels joined to the bottom portion of the storage compartment such that the service cart is transportable;
   at least one protective bumper attached to overlie an outer side of at least one vertical corner of the storage compartment so as to extend along at least a substantial portion of the height thereof and
   a top lid that is pivotally mounted to the top portion of the storage compartment for movement between open and closed positions, with at least one lift assist connected between the storage compartment and the top lid, wherein the top lid is supported in the open position by the at least one lift assist.

16. A transportable service cart for storing tools used for servicing automotive vehicles, the transportable service cart comprising:
   a generally box-like storage compartment comprising four vertical corners of the service cart that extend from a bottom portion of the storage compartment to a top portion thereof to define a height of the storage compartment;
   a plurality of wheels joined to the bottom portion of the storage compartment such that the service cart is transportable; and at least one protective bumper attached to overlie an outer side of at least one vertical corner of the storage compartment so as to extend along at least a substantial portion of the height thereof;

wherein the at least one protective bumper is attached to the vertical corners of the storage compartment with an adhesive.

17. A transportable service cart for storing tools used for servicing automotive vehicles, the transportable service cart comprising:

a generally box-like storage compartment comprising four vertical corners of the service cart that extend from a bottom portion of the storage compartment to a top portion thereof to define a height of the storage compartment;

a plurality of wheels joined to the bottom portion of the storage compartment such that the service cart is transportable; and at least one protective bumper attached to overlie an outer side of at least one vertical corner of the storage compartment so as to extend along at least a substantial portion of the height thereof;

wherein indicia are defined on the at least one protective bumper.

18. A transportable service cart for storing tools used for servicing automotive vehicles, the transportable service cart comprising:

a generally box-like storage compartment comprising four vertical corners of the service cart that extend from a bottom portion of the storage compartment to a top portion thereof to define a height of the storage compartment;

a plurality of wheels joined to the bottom portion of the storage compartment such that the service cart is transportable; and at least one protective bumper attached to overlie an outer side of at least one vertical corner of the storage compartment so as to extend along at least a substantial portion of the height thereof;

wherein the storage compartment comprises at least one slidably mounted drawer such that the drawer may be selectively opened and closed, and wherein the at least one slidably mounted drawer defines a generally planar front surface and is flanked by two of the protective bumpers, with each of the two protective bumpers defining a front face and a bumper depth in a perpendicular direction from the forward facing front faces of the flanking protective bumpers to the front surface of the drawer when the at least one slidably mounted drawer defines a slidably closed position, the at least one slidably mounted drawer further comprising:

at least one recess defined in the front surface of the drawer, wherein the at least one recess comprises a recessed surface inwardly offset from the front surface of the at least one slidably mounted drawer such that the at least one recess defines an offset depth in a perpendicular direction from the recessed surface to the front surface of the at least one slidably mounted drawer; and at least one drawer handle attached to the recessed surface of the at least one slidably mounted drawer, wherein the at least one drawer handle defines a handle depth that is not substantially greater than a combined distance of the offset depth of the at least one recess and the bumper depth of the protective bumpers such that the at least one drawer handle of the at least one slidably closed drawer does not extend substantially beyond the front faces of the flanking protective bumpers.

19. A transportable service cart according to claim 18 wherein the at least one drawer handle defines a handle depth that is not greater than a combined distance of the offset depth of the at least one recess and the bumper depth of the at least one protective bumper such that the at least one drawer handle of the at least one slidably closed drawer does not extend beyond the front faces of the flanking protective bumpers.

20. A transportable service cart according to claim 18 wherein the at least one drawer handle comprises a bar type handle comprising a gripping surface spaced from the recessed surface.

21. A transportable service cart according to claim 18 wherein the at least one drawer handle comprises an extruded handle comprising a gripping surface facing the recessed surface.

* * * * *